United States Patent
Cole et al.

(10) Patent No.: US 8,817,330 B2
(45) Date of Patent: Aug. 26, 2014

(54) METHOD FOR ADJUSTING QUALITY OF A PANTOGRAPH BACKGROUND PATTERN

(75) Inventors: John E. Cole, Prosperity, PA (US); Joseph J. Pfeuffer, Gales Ferry, CT (US); Michael R. Riley, Steubenville, OH (US)

(73) Assignee: Troy Group, Inc., Costa Mesa, CA (US)

(*) Notice: Subject to any disclaimer, the term of this patent is extended or adjusted under 35 U.S.C. 154(b) by 964 days.

(21) Appl. No.: 12/760,421

(22) Filed: Apr. 14, 2010

(65) Prior Publication Data

US 2010/0259792 A1 Oct. 14, 2010

Related U.S. Application Data

(60) Provisional application No. 61/169,277, filed on Apr. 14, 2009.

(51) Int. Cl.
*H04N 1/403* (2006.01)
*H04N 1/40* (2006.01)
*G06K 9/00* (2006.01)
*H04N 1/00* (2006.01)
*G06K 15/02* (2006.01)
*H04N 1/405* (2006.01)

(52) U.S. Cl.
CPC .............................. *H04N 1/00867* (2013.01)
USPC ........................ 358/2.99; 358/3.01; 382/100

(58) Field of Classification Search
CPC .................................................. H04N 1/32208
USPC .............. 358/2.99, 4.29, 3.01, 3.06; 382/100, 382/2.99
See application file for complete search history.

(56) References Cited

U.S. PATENT DOCUMENTS

| | | | |
|---|---|---|---|
| 5,641,183 A | 6/1997 | Diamond | |
| 5,873,604 A | 2/1999 | Phillips | |
| 6,101,293 A | 8/2000 | McKenzie | |
| 6,804,417 B1* | 10/2004 | Lund et al. | 382/299 |
| 2001/0030769 A1* | 10/2001 | Jacobs | 358/429 |
| 2007/0201719 A1* | 8/2007 | Hashimoto et al. | 382/100 |
| 2007/0241554 A1 | 10/2007 | Wicker et al. | |
| 2008/0089552 A1* | 4/2008 | Nakamura et al. | 382/100 |
| 2009/0207433 A1* | 8/2009 | Wang et al. | 358/1.11 |

OTHER PUBLICATIONS

International Search Report and Written Opinion, PCT/US2011/023610; completion date Mar. 23, 2011; 8 pages.
International Preliminary Report on Patentability, PCT/US2011/023610; completion date Oct. 16, 2012; 6 pages.

* cited by examiner

*Primary Examiner* — Gabriel Garcia
*Assistant Examiner* — Temitayo Folayan

(57) ABSTRACT

Pantograph background and foreground pairs that perform well in one printer may not perform as well in another. The main problem that occurs is the message is easily seen on the original print. By adjusting the background pattern quality, the pantograph is adjusted for optimal performance for a particular printer. The background pattern is adjusted by first adjusting the pixel density in the background pattern and second, by adding the adjusted cluster background pixel pattern.

13 Claims, 11 Drawing Sheets

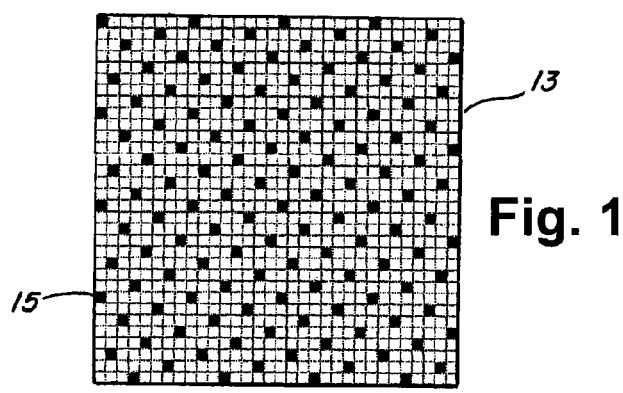
Fig. 1
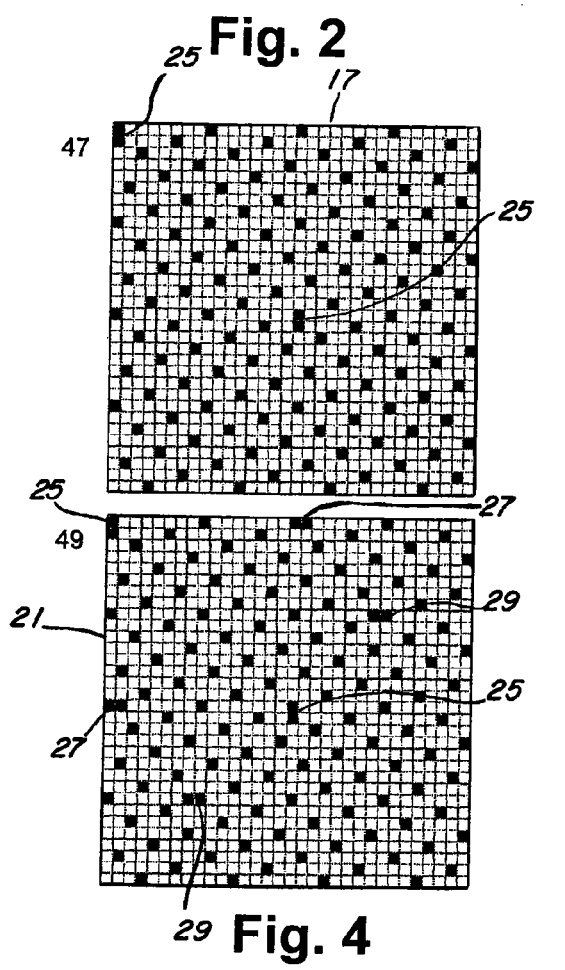
Fig. 2
Fig. 4
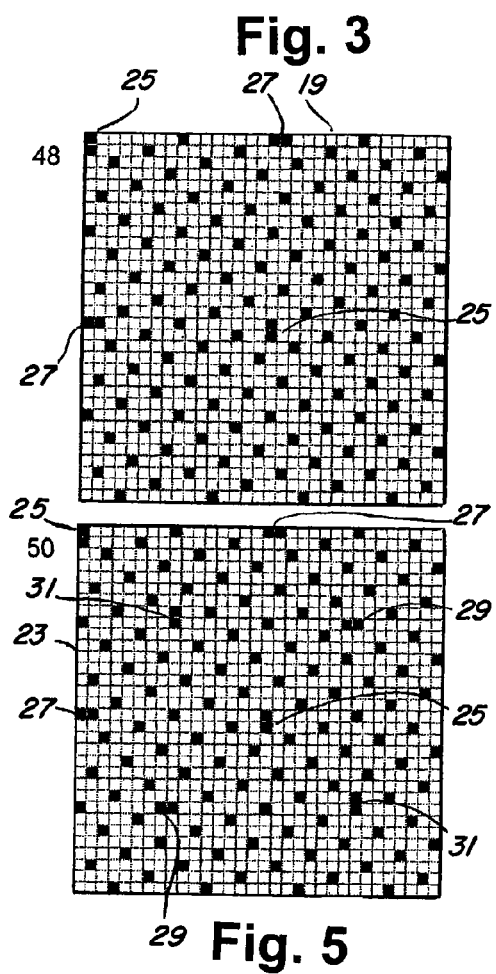
Fig. 3
Fig. 5

Fig. 6
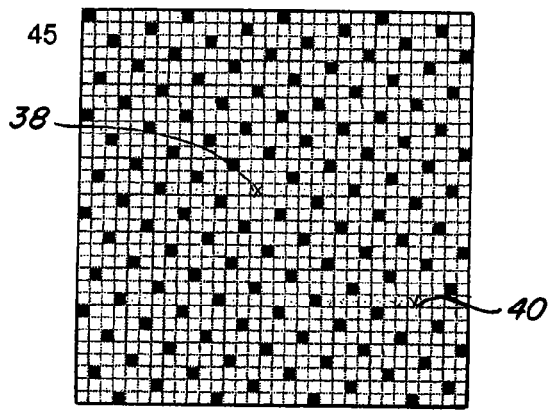
Fig. 7
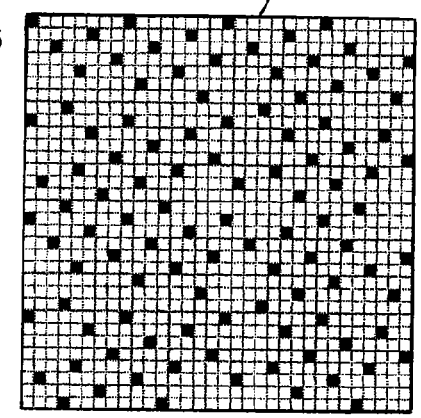
Fig. 8
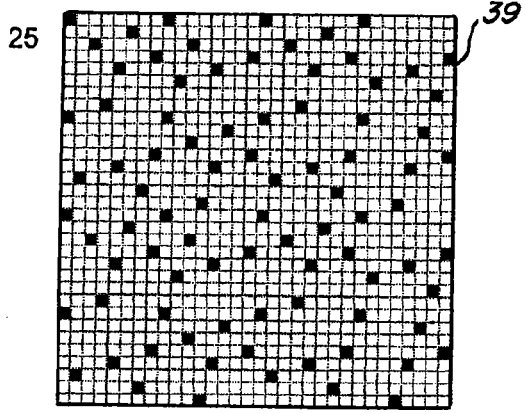
Fig. 9
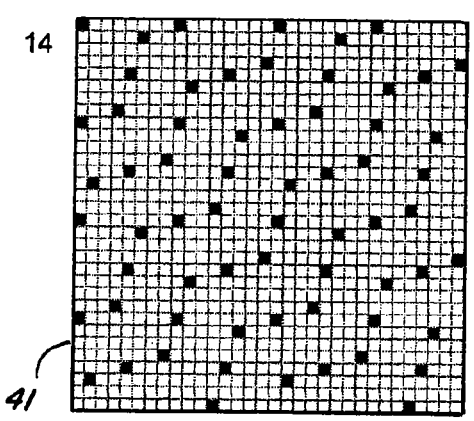
Fig. 10

METHOD FOR ADJUSTING QUALITY OF A PANTOGRAPH BACKGROUND PATTERN

CROSS-REFERENCE TO RELATED APPLICATION

This application claims the benefit of provisional patent application No. 61/169,277 filed Apr. 14, 2009, the disclosure of which is incorporated herein in its entirety.

BACKGROUND OF THE INVENTION

1. Field of the Invention

The present invention is directed to the printing of pantographs, and more specifically, prior to printing, adjusting the quality of the pantograph background pattern to obtain the highest quality pantograph message for a specific printer.

2. Description of Related Art

Fraud associated with written or printed documents such as bank checks or secured notes is an old and well known problem. Techniques include such things as alteration, counterfeiting and copying. A common practice for producing fraudulent checks is altering the payout amount to a higher value than originally intended. Another common practice is the printing of counterfeit checks which appear identical to the original.

An approach for combating such counterfeiting is to encode the original document with a pantograph. A pantograph is a printed message that is not readily distinguished on the original printed page, but becomes more clearly visible on a photocopy. Instead of being printed as fully filled in (i.e., opaque) characters, the characters in the pantograph message are filled in with a specific pixel formation. The background for the pantograph message is another pixel formation which is similar to the pixel formation used for the characters in the message. The two formations have a similar appearance so they appear to blend together on the original document. An original document with a pantograph message appears to have a shaded or textured background. The two patterns, the foreground and the background pattern, are designed and paired in such a way that they become differentiated when photocopied, due to the individual pixels not being precisely reproduced. Thus, the pantograph message (for example, the word "void"), is more visible on the copy.

Conventional pantographs provide special paper which has been pre-printed with a pantograph image. The paper tray and the printer is then loaded with the pre-printed paper which has the pantograph image. The advantage of this implementation is the pantograph is composed of higher resolution patterns than a printer is capable of imaging. However, the pre-printed paper must be printed and inventoried, which can be expensive.

Software applications have been used in pantograph applications. The software is used to add a pantograph to the document as a bitmap image background. The bitmaps occupy a significant part of the target page and may occupy several megabytes in addition to the document itself. A bitmap image increases the size of the print file requiring a greater amount of time to transfer a document to a printer. Additionally, access to the files containing the pantograph image requires control to prevent misuse. If a different pantograph message is required, a different bitmap must be implemented.

A method and apparatus for dynamically encoding pantograph messages on a document without significant cost or memory consumption is disclosed and claimed in co-pending U.S. application Ser. No. 12/638,593 filed Dec. 15, 2009 entitled Method and Apparatus for Secure Document Printing, the disclosure of which is incorporated herein in its entirety. This pending application is assigned to the same assignee as the present application. Although this system works quite well, and performs well on certain printer platforms and with certain toner types, it was found that for certain other printer platforms and toner types, it was not as effective. As a result of continued experimentation, it was found that the appearance of the generated pantograph can differ significantly between different types of toner used on different printer platforms. Furthermore, the pantograph can vary over the lifetime of a given toner cartridge. The problem presented was that the pantograph message could easily be seen on the original print. Although this problem could be alleviated somewhat by making adjustments to the density of the background patterns used, by using higher density background patterns as available. The system and method of U.S. Ser. No. 12/638,593 has the ability to utilize nine different pattern pairs to generate a pantograph. However, this flexibility was still found to not be enough to tailor the pantograph to all the different printers and toners in the marketplace. Additional flexibility is needed.

A method of manually adjusting the pattern quality was needed to customize a pantograph for the specific printer and toner being utilized. The present invention adjusts the pantograph background pattern to obtain optimal performance with a specific printer model and toner.

SUMMARY OF THE INVENTION

The quality of the pixel background pattern of a pantograph is adjusted in incremental steps to find the quality value for the background pattern that works best with a particular toner and copying machine. The quality value of the pixel background pattern is adjusted by adjusting the density of pixels in the pattern, and if necessary, adding random pixel patterns to the background.

BRIEF DESCRIPTION OF THE DRAWINGS

The exact nature of this invention, as well as the objects and advantages thereof, will become readily apparent upon consideration of the following specification in conjunction with the accompanying drawings in which like reference numerals designate like parts throughout the figures thereof and wherein:

FIG. 1 is a graphical representation of a pantograph background pattern according to an embodiment of the invention;

FIG. 2 is a graphical representation of a pantograph background pattern according to an embodiment of the invention;

FIG. 3 is a graphical representation of a pantograph background pattern according to an embodiment of the invention;

FIG. 4 is a graphical representation of a pantograph background pattern according to an embodiment of the invention;

FIG. 5 is a graphical representation of a pantograph background pattern according to an embodiment of the invention;

FIG. 6 is an illustration of the selection matrix used in the present invention;

FIG. 7 is a graphical representation of a pantograph background pattern according to an embodiment of the invention;

FIG. 8 is a graphical representation of a pantograph background pattern according to an embodiment of the invention;

FIG. 9 is a graphical representation of a pantograph background pattern according to an embodiment of the invention;

FIG. 10 is a graphical representation of a pantograph background pattern according to an embodiment of the invention;

DETAILED DESCRIPTION OF THE PREFERRED EMBODIMENTS

The present invention is a method for improving the pantograph images created by pixel representations stored in memory. During the document printing process the pantograph image is imaged first to form a pantograph. The pantograph message is chosen and a foreground pixel formation is chosen. The message is formed using an outline font. The outline font is filled with the foreground pixel formation. The foreground and background are then printed on the document.

To improve the quality of the pantograph and effectively customize the pantograph to the specific printer and toner being used, the present invention allows for adjustment of the quality of the pantograph by adjusting the density of pixel distribution in the background pixel pattern. The foreground pixel patterns are not adjusted.

The background pantograph pixel patterns used in the present invention are preferably 32×32 pixels. This standard pixel background pattern 13 is illustrated in FIG. 1. This pixel pattern has black pixels 15 that are evenly distributed throughout the 32×32 grid with an eight pixel spacing, resulting in a 12.5% density. The gridlines shown in FIG. 1 do not exist. They are shown here only for the purpose of illustration to help illustrate the pixel positions.

The method of the present invention for adjusting quality of the pantograph to obtain the optimum background pattern for a specific printer platform and toner comprises adjusting the density of the standard pixel background pattern by adding or removing black pixels.

The present invention contemplates adjusting the density of the standard background pixel pattern by 50 incremental steps. This range of pixel density adjustment was chosen as a result of experimentation by the inventors to determine what background density adjustment worked best for the greatest number of printer platforms and toners. The purpose of providing such a range is to maintain background densities in a range that produces good results with different types of toner and printer platforms, without being dark enough to obscure the text of the original document.

Figure 16:
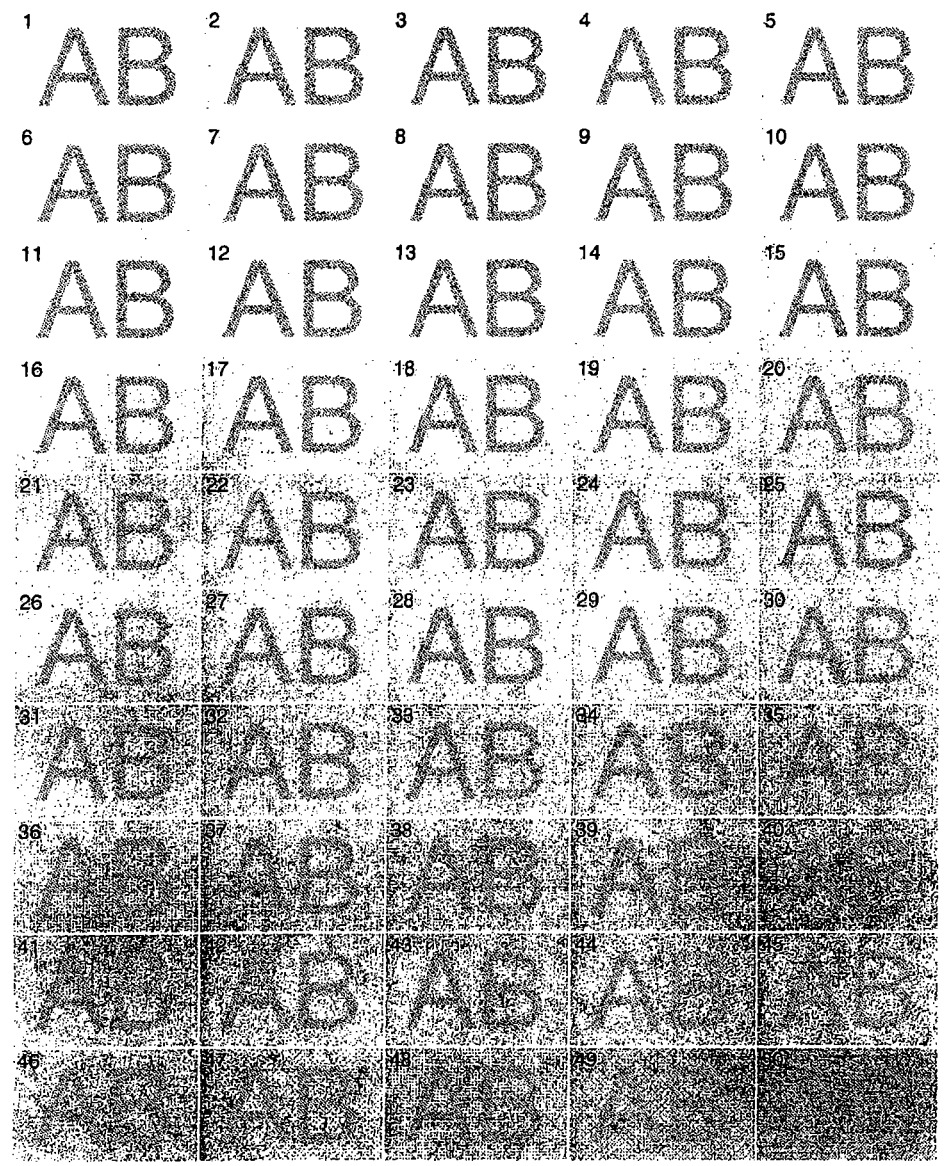
FIG. 16 is a graphical representation of a pairing of the pantograph backgrounds of FIGS. 1-5, 7-10, and 12-15 with a single pantograph foreground.

FIG. 16 illustrates each one of the 50 background pixel pattern densities available, according to the present invention, paired with a standard foreground pixel pattern "AB," which does not vary from background density to background density.

FIG. 1 illustrates a background pixel pattern 13 having a quality value of 46. Quality value 46 is in the range of the first 50 quality values shown in FIG. 16, according to the method of the present invention.

As the quality values increase from 47 to 50, as shown in FIG. 16, two black pixels are added with each quality value increment. The actual increase in black pixel density with each increment is about 0.2%.

For example, FIG. 2 illustrates the background pixel density for the quality value 47. The pixel distribution 17 of FIG. 2 is arrived at by taking the pixel distribution 13 of FIG. 1 which has a quality value of 46 and adding two black pixels in a pattern, 25 as shown in FIG. 2.

FIG. 3 illustrates a background pixel pattern having a quality value 48. This pixel pattern is generated by adding two more pixels in a pattern 27 to the pixel pattern 17 of FIG. 2.

FIG. 4, which has a quality value of 49, has a pixel pattern distribution 21 having two more black pixels added in a pattern 29 to pixel pattern 19 of FIG. 3.

FIG. 5, which has a quality value of 50, shows a pixel pattern 23 which has two more pixels added in a pattern 31 to pixel pattern 21 of FIG. 4.

Besides adding pixels to standard background pixel pattern 13, which has a quality value of 46, to get the density patterns shown in FIGS. 2, 3, 4 and 5 and quality values 47, 48, 49 and 50, the present invention contemplates removing two pixels from the standard background pixel pattern 13 of FIG. 1 to obtain the quality values 46 to 14. To determine which pixels are to be removed by each decrement of quality 45 to 14, the present invention contemplates the use of a weight matrix 33, as shown in FIG. 6. This matrix was arrived at by experimentation. The purpose of the weight matrix is to remove pixels so that the remaining pixels are somewhat evenly spaced throughout the background pixel pattern. In this way, the pattern maintains the appearance of even shading without spots or stripes.

The standard background pixel pattern 13 of FIG. 1, which has a quality value of 46 and a density of 12.5%, has one black pixel for each eight pixel slots. Each group of eight pixel slots can be considered one pixel byte. The pixel bytes are identified as starting in the upper left hand corner, as the number 1 location, moving towards the right in the first line, and so on, down the 32 lines to the lower right hand corner.

The weight matrix 33 of FIG. 6 has one entry for each of the 128 bytes in the standard pixel pattern 13 of FIG. 1. For example, the upper left hand corner of matrix 33, in the first row has a weight value of 0. This weight value represents the first byte in the upper left hand corner of pixel array 13 of FIG. 1. Likewise, the lower left hand corner of matrix 33 has a weight value of 32 which represent the pixel byte in the lower left hand corner of background pixel array 13.

Using the weight matrix 33, two pixels are removed each time the quality value is decremented by one. Which two pixels are to be removed is specified by weight value in the weight matrix 33 corresponding to that specific byte in the standard pixel background 13 of FIG. 1. For example, assume that the background quality value of 45 is desired, as shown in FIG. 7. According to the weight matrix 33, each black pixel in a pixel byte having a weight of 45 or greater is removed. Pixel byte 34, the second pixel byte in the 15th row of matrix 33 and pixel byte 36, the 4th byte in the 24th row of matrix 33, have a weight of 45 or higher. These are the only two pixel bytes having a weight of 45, resulting in the black pixel in each one of these two bytes to be removed. Accordingly, black pixel 38 in background pixel pattern 35 is removed because of the weight of pixel byte 34 in matrix 33. Pixel 40 in background pixel pattern 35 is removed because of the weight of pixel byte 36 in matrix 33 of FIG. 6.

Each time the pixel density value is decremented, starting with 45, all the way down to 14, two additional black pixels are removed in this manner.

FIG. 8 illustrates pixel background pattern 37 for a quality value of 35 which is obtained in the manner described above.

FIG. 9 shows a pixel background pattern 39 with quality value 25 obtained in the manner described above.

FIG. 10 shows pixel background pattern 41 with a quality value 14, obtained in the manner described above.

By the time the quality value has decreased to 14, 64 of the 128 black pixels in the standard pixel background patterns, having quality value 46 have been removed. This is essentially removing half of the black pixels from the standard background pixel pattern 13 of FIG. 1. As can be seen in FIG. 10, the pixel pattern produced by matrix 33 at the quality value 14 is not an evenly spaced pixel pattern.

In order to generate background pixel patterns having density quality values of 13 down to 1, the present invention contemplates taking the first 13 rows of standard background pixel pattern 13 of FIG. 1 and interleaving these 13 rows with all white rows. The resulting pattern is pixel pattern 43 of FIG. 11.

To derive the background pixel patterns having quality values 13 down to 1, the non-zero values in the first half of the pixel weight matrix 33 are all decremented by 32. Then the matrix is applied, as described above, to the rows in the pixel pattern 43 that contain black pixels.

Figure 12:
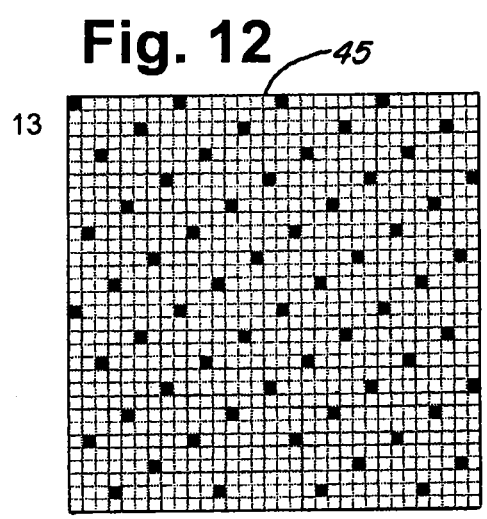
FIG. 12 is a graphical representation of a pixel background pattern used in an embodiment of the invention.

FIG. 12 shows a pixel background pattern 45 having a quality value of 13.

Figure 13:
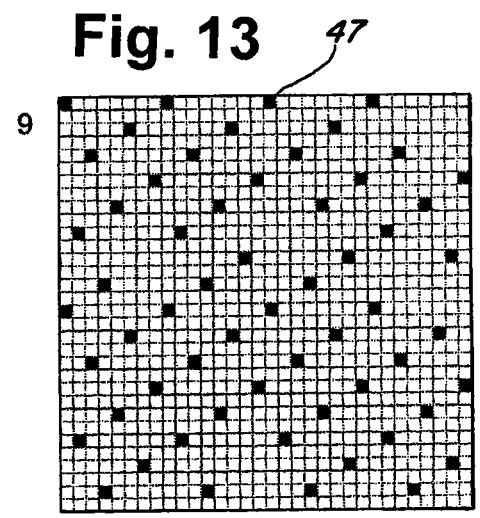
FIG. 13 is a graphical representation of a pantograph background pattern according to an embodiment of the invention.

FIG. 13 shows a pixel background pattern 47 having quality value 9.

Figure 14:
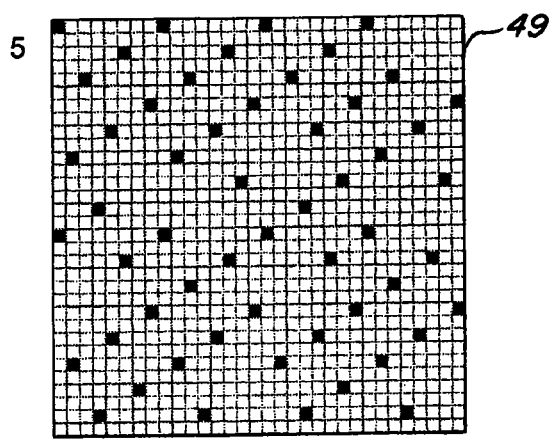
FIG. 14 is a graphical representation of a pantograph background pattern according to an embodiment of the invention.

FIG. 14 shows pixel background pattern 49 having quality value 5.

Figure 15:
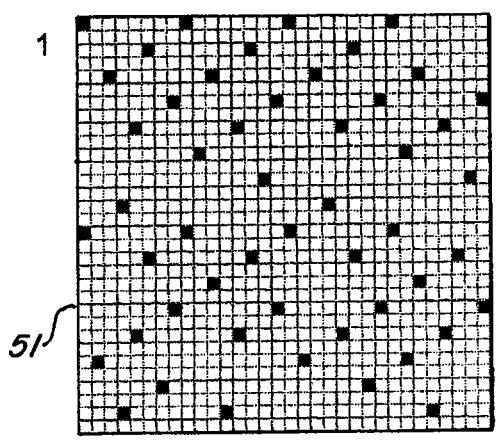
FIG. 15 is a graphical representation of a pantograph background pattern according to an embodiment of the invention.

FIG. 15 shows pixel background 51 having density quality 1.

These pixel background patterns were obtained as follows, for example. Pixel byte 34 which is the second pixel byte in row 15 of the weight matrix 33 is normally at a weight of 45. By decrementing each of the numerical values in the matrix by 32, the numerical value of 45 becomes 13. Accordingly, the pixel background pattern 45 of FIG. 12 having a quality value of 13 has one pixel removed. One pixel is removed for each decrement of quality value from 13 down to 1.

Figure 11:
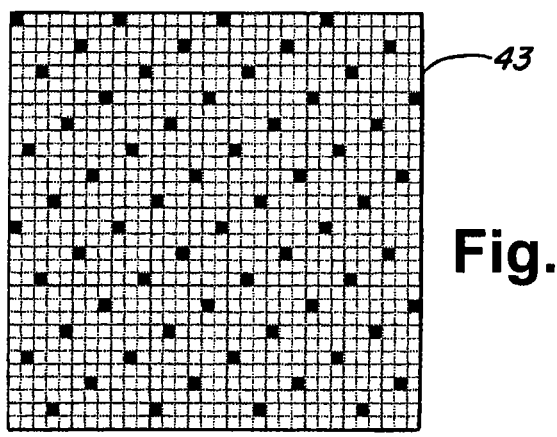
FIG. 11 is a graphical representation of a pantograph background pattern according to an embodiment of the invention.

When the quality value is 1, 13 pixels have been removed from the standard background pixel pattern 43 of FIG. 11 leaving a background pixel pattern having only 51 black pixels, as shown in FIG. 15. This decrease in black pixel density for each decrement of quality valve from 13 to 1 is about 0.1%. The change in density for each change in quality values above 14 is about 0.2% per increment. This density change at the lower end of the density range is a much finer incremental change.

When the quality value is 50, the background pixel pattern contains 136 black pixels. When the quality value is 1, the background pixel pattern contains 51 black pixels. Accordingly, the actual pixel densities for the quality values ranging from 1 to 50 range from about 5% to about 13%.

It has been found that when a pantograph is implemented using a foreground pixel pattern that has clustered pixels which is used to effectively decrease resolution of the foreground pattern, i.e., or the pantograph message, a grainy appearance becomes prevalent. To blend the foreground and background patterns together better, it has been discovered that adding smaller clusters of pixels to the background pattern gives it a grainy appearance. The result is the foreground and background patterns blend together more effectively when the original print is viewed with the naked eye. In other words, the pantograph message is a lot less visible. The addition of these pixel clusters to the background pattern is like the addition of noise to the background pixel pattern. The addition of this noise to pixel background patterns having quality values 1 through 50 provides an additional set of pixel background patterns with quality values 51-250, as illustrated in FIGS. 25, 26, 27 and 28.

Figure 17:
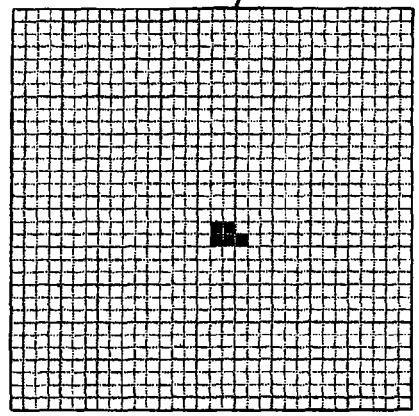
FIG. 17 is a graphical representation of an example of a pixel cluster added to a background pattern, according to an embodiment of the present invention.
Figure 25:
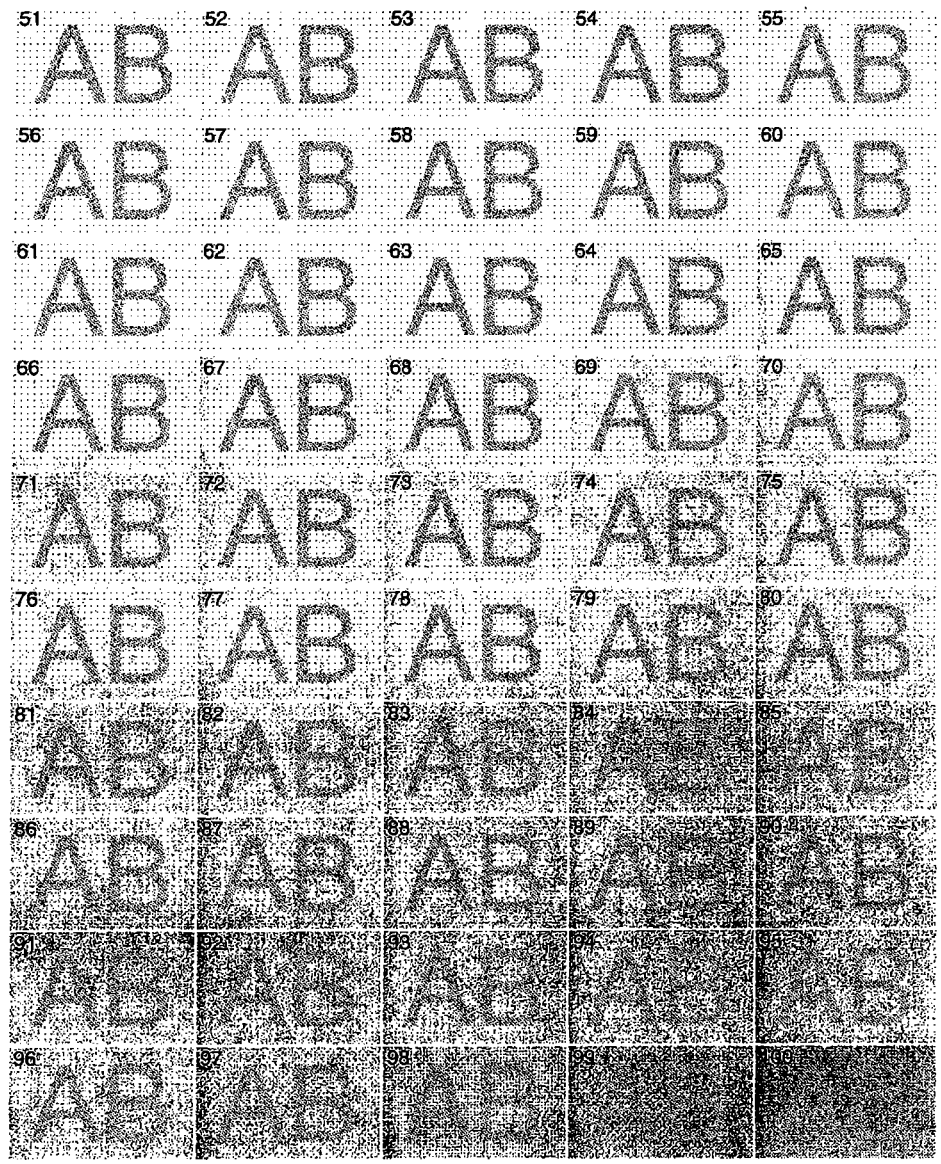
FIG. 25 is a graphical representation of a pairing of a certain foreground with a variety of pantograph backgrounds and the addition of the pixel clusters of FIG. 17.

An embodiment of the present invention is to utilize four distinct pixel clusters as noise to be added to the background pixel patterns having quality values of 1 through 50. For example, FIG. 25 illustrates a pantograph using a background pixel pattern having quality values 51 through 100. These background pixel patterns are obtained by combining the noise pixel cluster 53, shown in FIG. 17, with each one of the background pixel patterns having quality values 1 through 50, of FIG. 16.

Figure 18:
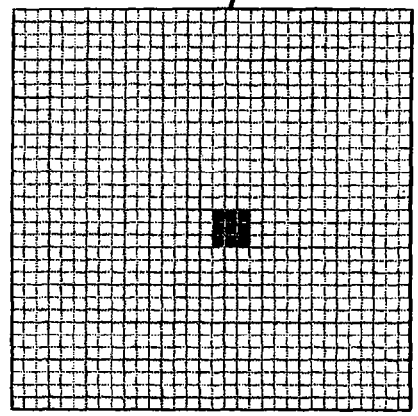
FIG. 18 is a graphical representation of an example of a pixel cluster added to a background pattern, according to an embodiment of the present invention.
Figure 26:
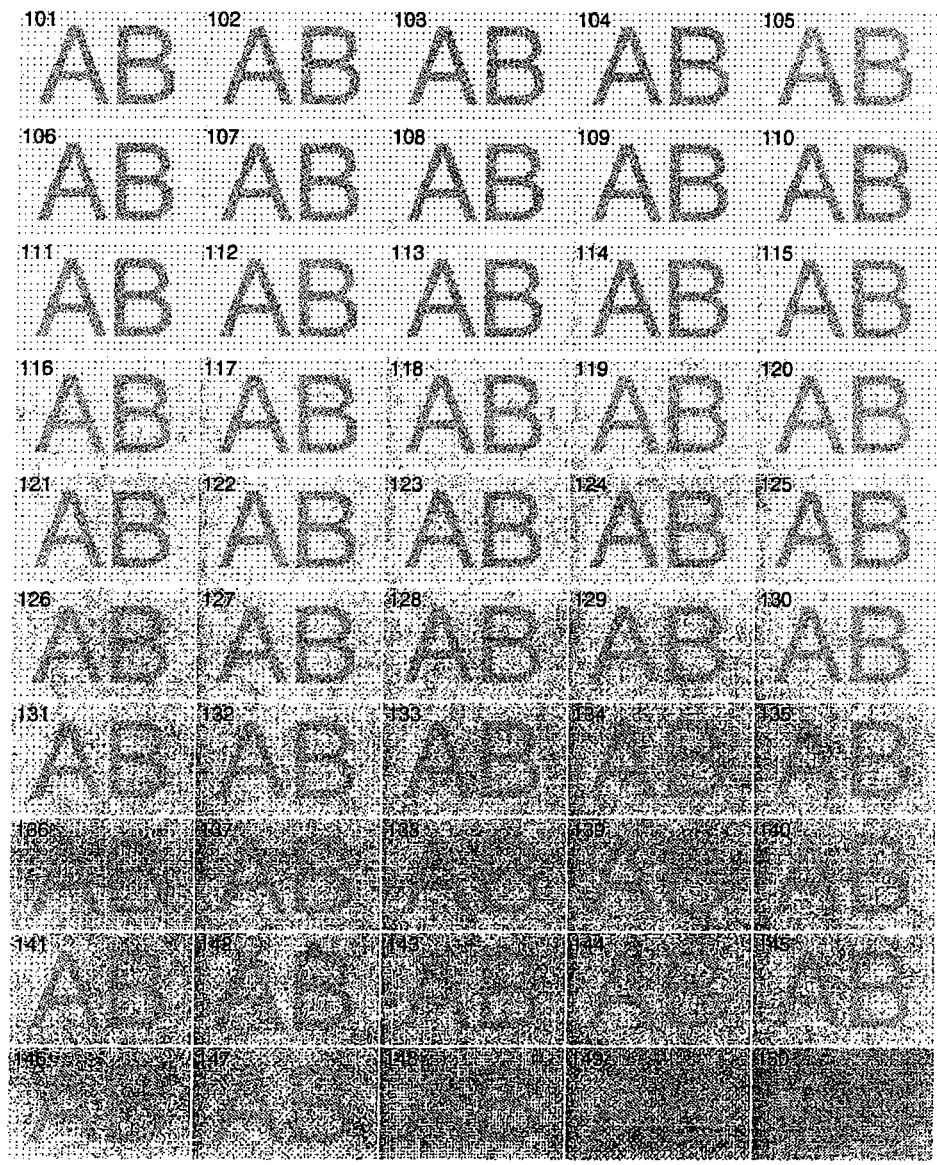
FIG. 26 is a graphical representation of a pairing of a pantograph foreground with a variety of pantograph backgrounds and the addition of the pixel clusters of FIG. 18.

FIG. 26 shows a combination of noise pixel cluster 55 of FIG. 18 with background pixel patterns having quality values 1 through 50.

Figure 19:
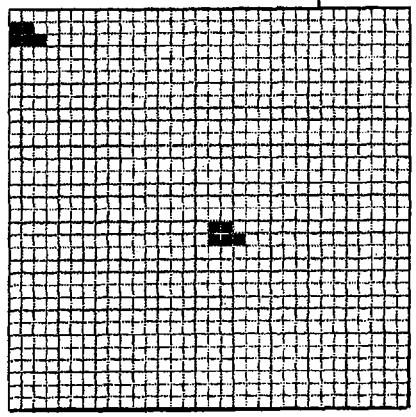
FIG. 19 is a graphical representation of an example of a pixel cluster added to a background pattern, according to an embodiment of the present invention.
Figure 27:
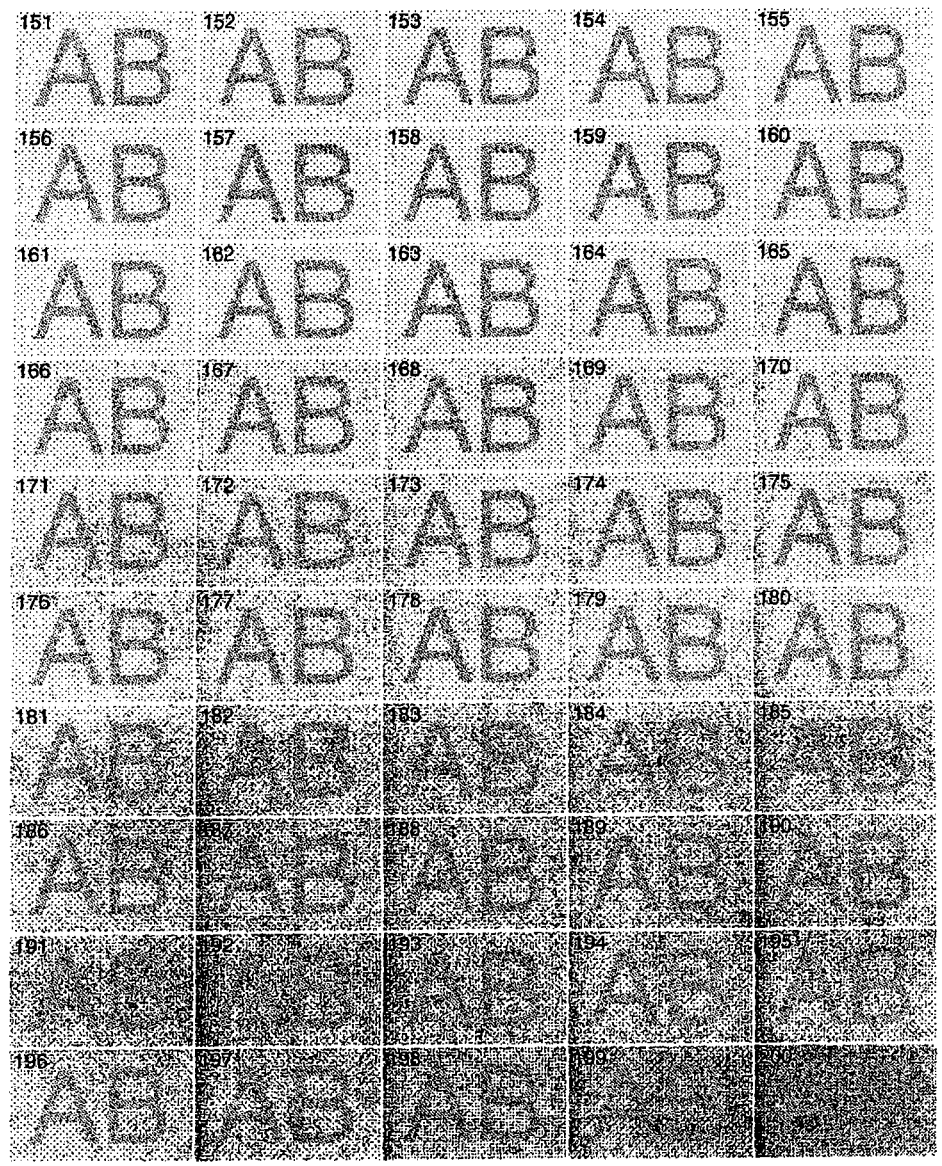
FIG. 27 is a graphical representation of a pairing of a pantograph foreground with a variety of pantograph backgrounds and the addition of the pixel clusters of FIG. 19.

FIG. 27 shows a combination of pixel noise cluster 57 of FIG. 19 with background pixel patterns having quality values 1 through 50.

Figure 20:
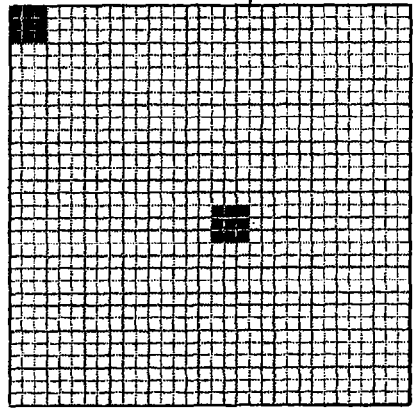
FIG. 20 is a graphical representation of an example of a pixel cluster added to a background pattern, according to an embodiment of the present invention.
Figure 28:
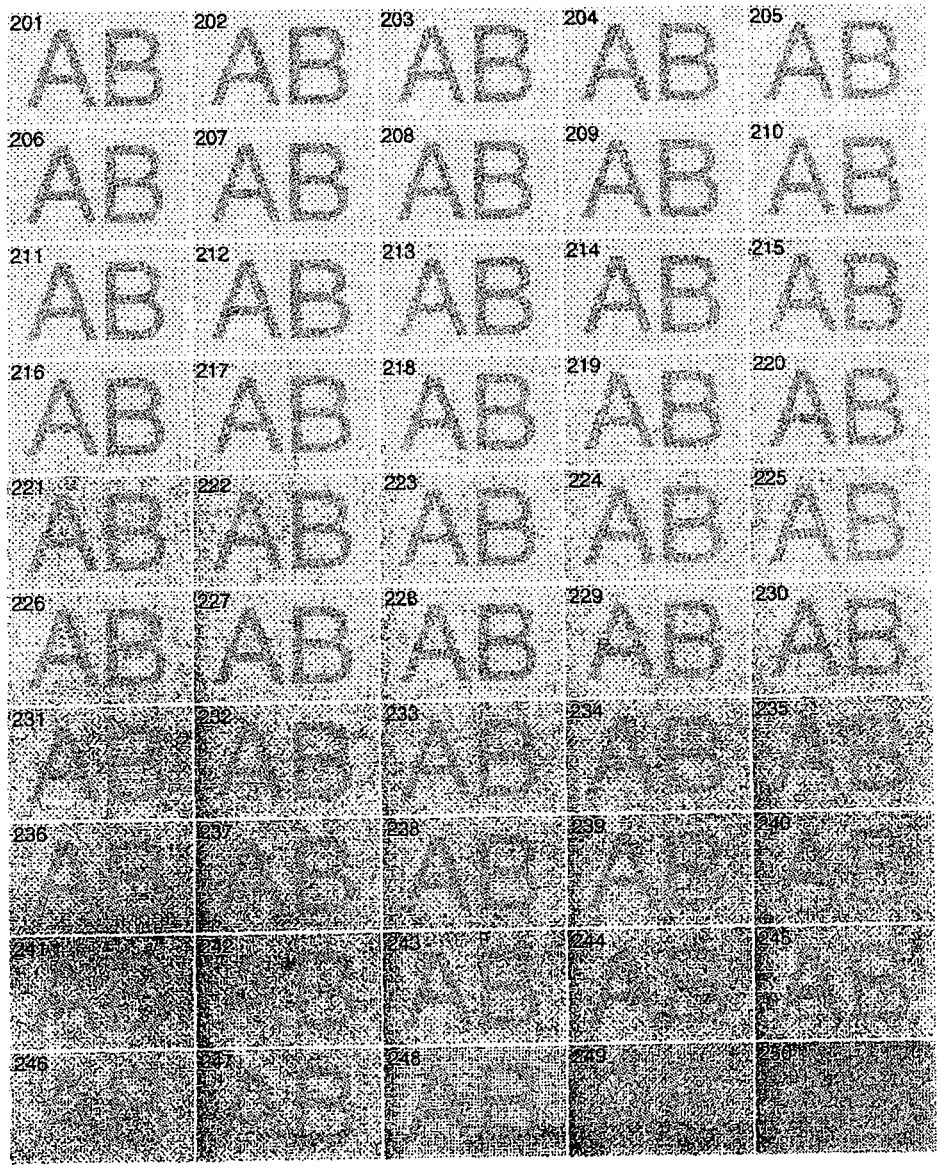
FIG. 28 is a graphical representation of a pairing of a pantograph foreground with a variety of pantograph backgrounds and the addition of the pixel clusters of FIG. 20.

FIG. 28 shows a combination of pixel clusters 59 of FIG. 20 with background pixel patterns having quality values 1 through 50.

The result is that the background pixel patterns available now range in quality values from 1 to 250. As noted earlier, the background pixel patterns having quality values ranging from 1 to 50 have no noise. The background pixel patterns having quality values ranging from 51 to 250 have noise added, pursuant to the above described process using the pixel noise clusters shown in FIGS. 17, 18, 19 and 20.

The relationship between the quality value and noise can be expressed by the equation quality=density+(noise×50).

The addition of the pixel clusters 53, 55, 57 and 59 illustrated in FIGS. 17, 18, 19 and 20 respectively, to the background pixel patterns having quality values 1 through 50, is illustrated in FIGS. 21, 22, 23 and 24.

Figure 21:
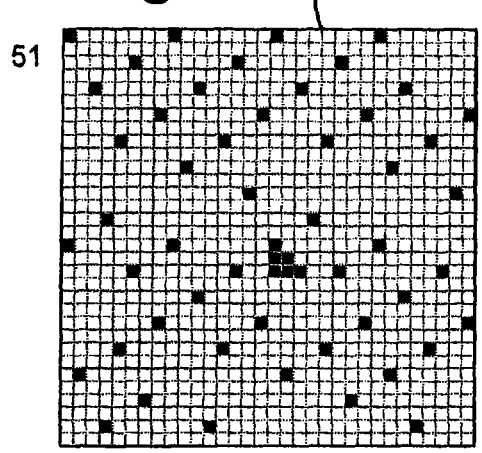
FIG. 21 is a graphical representation of the addition of the pixel cluster of FIG. 17 to a certain density background pattern, according to an embodiment of the present invention.

FIG. 21 illustrates a background pixel pattern with a value of 51. This pattern is the combination of the background pixel pattern having a quality index of 1, illustrated in FIG. 15, and the noise pixel cluster 53 of FIG. 17.

Figure 22:
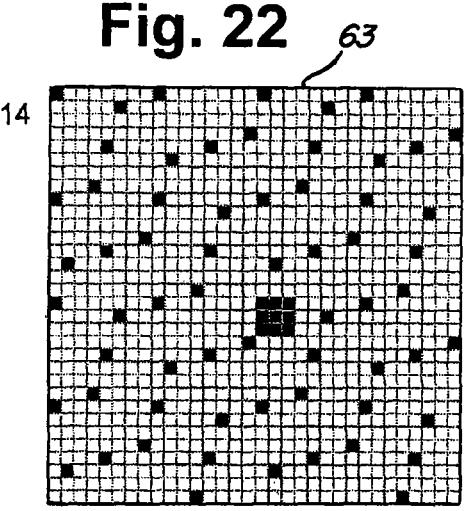
FIG. 22 is a graphical representation of the addition of the pixel clusters of FIG. 18 to a certain density background pattern, according to an embodiment of the present invention.

FIG. 22 illustrates a background pixel pattern with a quality value of 114. This pattern is a combination of the background pixel pattern 41 of FIG. 10, having a quality value of 14, with the pixel cluster 55 of FIG. 18.

Figure 23:
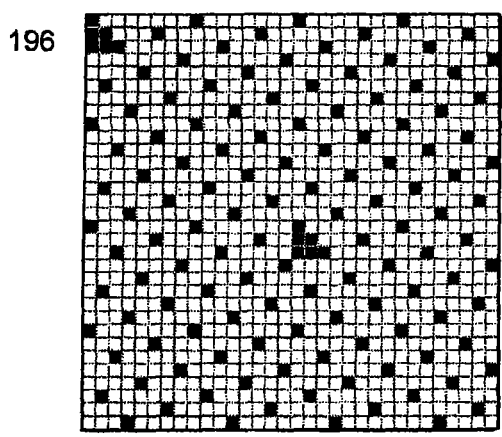
FIG. 23 is a graphical representation of the addition of the pixel clusters of FIG. 19 to a certain density background pattern, according to an embodiment of the present invention.

FIG. 23 illustrates a background pixel pattern with a quality value 196. This pattern is a combination of the pixel background pattern 15, of FIG. 1, having a quality value of 46 and the pixel cluster pattern 57 of FIG. 19.

Figure 24:
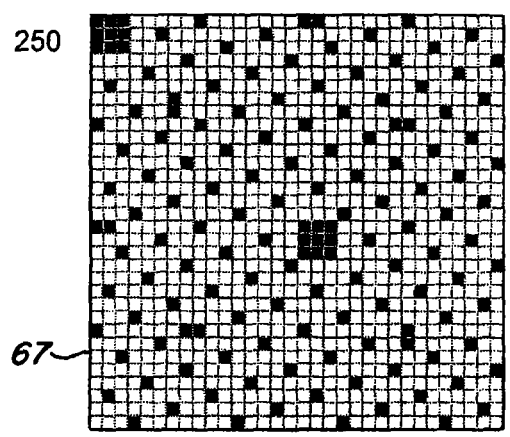
FIG. 24 is a graphical representation of the addition of the pixel clusters of FIG. 20 to a certain density background pattern, according to an embodiment of the present invention.

FIG. 24 illustrates a background pixel pattern with a quality value 250. This pattern is a combination of pixel 23 pattern background of FIG. 5, having a quality index of 50 with the pixel cluster pattern 59, of FIG. 20.

At the maximum quality index setting of 250, according to the preferred embodiment of the present invention, the noise and density are both maximized.

Figure 29:
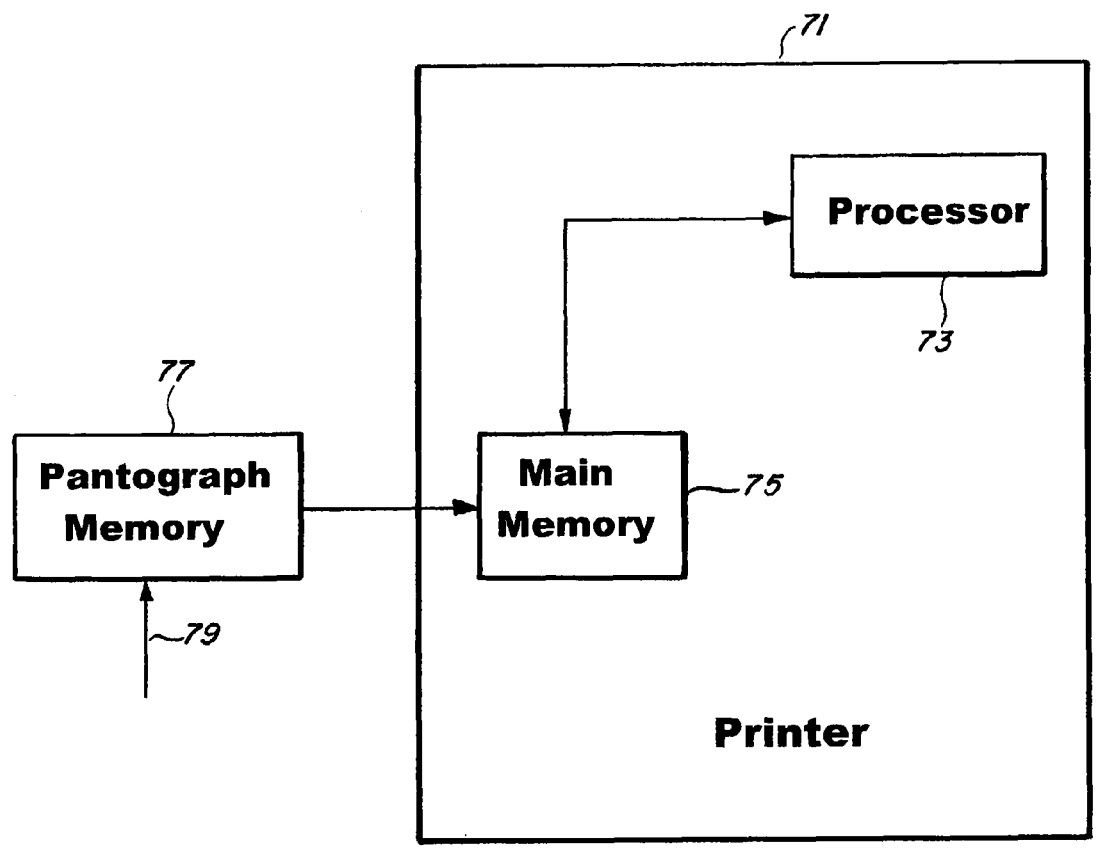
FIG. 29 is a block diagram representative of a printer system for printing the pantograph embodiments of the present invention.

The methods described above are implemented and practiced by various printer platforms available in the marketplace like Hewlett-Packard, Canon, Lexmark, etc. As shown in FIG. 29, each of these printer platforms 71 has a processor 73 communicating with a main memory 75 to perform the required functions of the printer, the primary function being the printing of black dots on a blank sheet of paper.

The background and foreground pixel patterns described above, are also printed by printer platform 71, according to instructions received from pantograph memory 77 which connects to the main memory 75 of the printer 71. Pantograph memory 77 contains instructions and data, as is well known in the art, to generate the background and foreground pixel patterns described above.

The quality adjustment to the background pixel patterns, as described above, is implemented by a selection function 79, sent to pantograph memory 77.

What is claimed is:

1. A method for adjusting the quality of a pantograph having a foreground pixel pattern used to form a pantograph message and a background pixel pattern within which the pantograph message is located, for a specific printer, before printing of the pantograph message and background pixel pattern on a substrate that contains image information using the specific printer, the steps of the method comprising:

selecting a base pixel pattern having a predetermined pixel density, wherein pixel density is measured as the ratio of colored pixels to total pixels in a given pixel pattern;

providing a plurality of background pixel patterns, each background pixel pattern having a different pixel density and being on a pixel grid of similar dimensions, wherein at least one of the background pixel patterns is formed by removing at least one pixel from the base pixel pattern, the at least one pixel being selected based on a predetermined matrix; and selecting a background pixel pattern from the plurality of background pixel patterns that provides the best quality pantograph for the specific printer, whereby the pantograph message and selected background pixel pattern printed by the specific printer visually obscures the pantograph message in the printed background pixel pattern on the printed substrate, and clearly displays the pantograph message in an electrophotographic copy of the printed substrate.

2. The method of claim 1 wherein the providing a plurality of background pixel patterns step comprises adding one or more pixels incrementally to the base pixel pattern.

3. The method of claim 2 wherein the adding pixel step comprises adding two pixels for each increment.

4. The method of claim 1 further comprising the step of adding one or more pixel clusters, incrementally, to the background pixel pattern.

5. The method of claim 1 wherein removing at least one pixel from the base pixel pattern comprises removing two pixels decrementally.

6. The method of claim 5 further comprising the step of adding one or more pixel clusters, incrementally, to the background pixel pattern.

7. The method of claim 1 wherein the providing background pixel pattern step comprises:

changing alternating rows of pixels from the base pattern to rows having no black pixels; and removing one or more pixels decrementally from the new base pattern.

8. The method of claim 7 wherein the removing pixel step comprises removing one pixel for each decrement.

9. The method of claim 1 wherein the predetermined pixel density of the base pixel pattern is 12.5%.

10. The method of claim 9 wherein the pixels are evenly distributed throughout the base pixel pattern.

11. The method of claim 1 wherein the providing pixel patterns step comprises adding one or more pixel clusters incrementally to the base pixel pattern.

12. The method of claim 11 wherein the adding pixel clusters step comprises increasing the number of pixels in the clusters as the pixel density of the selected base pixel pattern is increased.

13. The method of claim 1 further comprising the step of adding one or more pixel clusters incrementally to the background pixel pattern.

\* \* \* \* \*